United States Patent [19]

Parkinson et al.

[11] 4,172,065

[45] Oct. 23, 1979

[54] SOLVENT SYSTEM FOR POLYACRYLONITRILE AND OTHER POLYMERS AND USE OF SAME FOR CASTING FILM, FOR SPINNING FIBERS AND FOR COATING

[75] Inventors: Dean B. Parkinson, Redwood City; Norman Fishman, Menlo Park, both of Calif.

[73] Assignee: Trian Company, San Francisco, Calif.

[21] Appl. No.: 895,308

[22] Filed: Apr. 11, 1978

[51] Int. Cl.² .................... C08L 33/20; C23G 5/00
[52] U.S. Cl. .................... 260/29.6 AQ; 252/170; 252/171; 427/171
[58] Field of Search ......... 260/29.6 AQ, 32.4, 29.2 R; 252/171, 170, 162, 541

[56] References Cited

U.S. PATENT DOCUMENTS

| | | | |
|---|---|---|---|
| 2,658,879 | 11/1953 | Beaman | 260/32.4 |
| 3,957,672 | 5/1976 | Zisman | 252/171 |

*Primary Examiner*—Joseph L. Schofer
*Assistant Examiner*—Peter F. Kulkosky
*Attorney, Agent, or Firm*—Edward B. Gregg

[57] ABSTRACT

Solvent system for polyacrylonitrile polymers comprising nitromethane, water and fluoro alkanol. The solvent enables a high concentration of polymer to be dissolved without the solution being too viscous to cast as a film or to spin as a fiber. The solvent is sufficiently soluble that it can be removed substantially completely from the resulting film or fiber with consequent advantages of leaving no toxic residue and of not discoloring the end product.

16 Claims, No Drawings

SOLVENT SYSTEM FOR POLYACRYLONITRILE AND OTHER POLYMERS AND USE OF SAME FOR CASTING FILM, FOR SPINNING FIBERS AND FOR COATING

This invention relates to the utilization of acrylonitrile homo-polymers and copolymers, also of other difficultly soluble, highly polar polymers such as polyimides.

A considerable literature, patent and otherwise, has accumulated on the subject of acrylonitrile homo-polymers and copolymers (For convenience unless the context indicates otherwise the term "polymers" will include both homo-polymers and copolymers). These polymers are useful for the production of fibers (so called acrylic fibers) by the wet spinning process and by the dry spinning process. In wet spinning the polymer is dissolved in a suitable solvent and after passing through a spinneret the resulting fibers are passed through a liquid which extracts the solvent contained in the fibers. In the dry spinning process the solvent is removed from the fibers by heat and vaporization.

In both the dry spinning and wet spinning processes the fibers are stretched and otherwise processed after spinning and solvent removal.

Acrylonitrile polymers have also been used to produce film. A number of U.S. patents have been granted to Standard Oil Company of Ohio on this subject, among them Isley U.S. Pat. No. 3,437,717, hereinafter referred to for convenience as the Isley patent.

The Isley patent notes difficulties in the preparation of film from linear acrylonitrile homo-polymers, for example, brittleness of the film unless high molecular weight (500,000 or more molecular weight) polymers are employed and that at such high molecular weight the homo-polymers, when dissolved in a solvent to an acceptable concentration, produce very viscous solutions which are difficult to cast. The Isley patent proposes the free radical copolymerization of acrylonitrile (or of other alpha, beta-monoolefinically unsaturated nitrile monomer) with a polyalkenyl monomer such as butanediol-1,4-divinyl ether; dissolving the solid copolymer, after separating it from the reaction mixture, in a solvent such as dimethyl formamide and ethylene carbonate to a concentration typically about 17%; then casting the solution on a steel belt and removing solvent by means of heat.

The film so formed has a high degree of impermeability to gases such as oxygen and carbon dioxide and to moisture and it provides an excellent wrapping for food products and other products which are to be protected from oxidation and from moisture. However, it has been difficult to eliminate residual solvent. The favored solvent is dimethyl formamide which is, or is likely to be toxic. Moreover, it has been difficult, if indeed it is possible, to obtain film of low permeability.

It is an object of the present invention to provide a solvent which dissolves acrylonitrile polymers (and other highly polar, difficultly-soluble polymers such as polyimides) in sufficient concentration to be practicable for casting films, for spinning fibers and for coating applications yet which can be removed in its entirety by application of heat at a temperature below the point of degradation of the end product and which does not leave an objectionable residue in the end product.

We have found that an advantageous solvent for polymers of this character is provided by a solution containing nitromethane, water and 2,2,2-trifluoroethanol (hereinafter referred to as TFE). The proportions of the components of this solvent may vary within limits as follows, percentages being by weight.

TABLE I

| Nitromethane | 75–95% |
|---|---|
| Water | 3–20% |
| TFE | 2–10% |

A preferred solvent is as follows:

TABLE II

| Nitromethane | 84.8% |
|---|---|
| Water | 10.1% |
| TFE | 5.1% |

The nitromethane may be substituted in whole or in part by nitroethane. The TFE may be substituted in part or in whole by other highly fluorinated lower molecular weight ($C_2$ to $C_5$) alkanols and trifluoromothoxy and -ethoxy $C_1$ to $C_5$ alkanols, also by heptafluoro isopropanol, such as the following:

$CF_3CH_2CH_2OH$
$CF_3(CH_2)_3OH$
$CF_3(CH_2)_4OH$
$CF_3-O-CH_2-OH$
$CF_3-O-(CH_2)_2OH$
$CF_3-O-(CH_2)_3OH$
$CF_3-O-(CH_2)_4OH$
$HCF_2-CF_2CH_2OH$
$HCF_2-(CF_2)_nCH_2OH (n=2,3,4,5$ or $6)$
$CF_3-C_1F-CF_3$
       $|$
       $OH$

It will be observed that all of these are highly fluorinated lower alkanols or trifluoromethoxy or ethoxy derivatives of lower alkanols. Mixtures of two or more of these fluoro alkanols in any proportions may be used. Proportions of the fluoro alkanol, water and nitromethane may be as set forth in Tables I and II above.

Dry polymer to be spun into fibers by the dry process, or to be cast as a film or to be applied as a coating is dispersed in this solvent at or above room temperature. Then it is dissolved by vigorous mixing in a high speed homogenizer or similar dissolving apparatus at 90°–100° C. for a suitable period of time.

After a solution is obtained it should be maintained at temperature of 60°–80° C. until a stage of fiber spinning or film casting process is reached at which coagulation is desired. Solutions prepared in this manner are water white and have a sufficiently low viscosity to be spun into fibers through spinnerettes conventionally used in the dry spinning process. Pilot runs with effective dissolution procedures are able to produce solutions with 30% or higher polymer concentrations.

The following example will serve further to illustrate the practice and advantages of the inventions.

EXAMPLE I

An acrylonitrile polymer was prepared employing the procedure of the Isley patent, Example I. The product was a white, granular powder. It was dissolved in the solvent of Table II in the amount of 15% by weight of the procedure described above and was cast as a film by doctor blading the hot (90° C.) solution on a heated (70° to 90° C.) metal plate. A film having a thickness of 1.5 mil. was obtained. As much as 30% of the acrylonitrile polymers has been dissolved in this solvent. The cast film may be stretched biaxially to produce a highly impermeable film.

It will, therefore, be apparent that a new and advantageous solvent system and new and useful solutions of difficultly soluble polmers have been provided.

We claim:

1. A solvent system comprising a solution containing water, a nitro alkane containing 1 to 2 carbon atoms and a polyfluorinated alkanol, said nitro alkane predominating and constituting more than 50% by weight of the solution, said water and polyfluorinated alkanol being present in quantities sufficient to provide a solvent for polyacrylonitrile polymers.

2. The solvent system of claim 1 wherein the ingredients are present as follows:

| Component | Amount (% by weight) |
|---|---|
| Water | 3 to 20 |
| Nitro alkane | 75 to 95 |
| Polyfluorinated lower alkanol | 2 to 10 |

3. The solvent system of claim 2 wherein the nitroalkane is nitromethane and the fluorinated lower alkanol is selected from the class consisting of:

$CF_3(CH_2)_mOH$ $CF_3-O-(CH_2)_mOH$ $CHF_2(CF_2)_nOH$ wherein m is an integer from one to four and n is an integer from one to six.

4. The solvent system of claim 3 wherein the fluorinated alkanol is 2,2,2,-trifluoroethanol.

5. A solvent system as follows:
   Water, about 10%
   Nitroethane, about 85%
   2,2,2-trifluoroethanol, about 5% percentages being by weight.

6. A solution of difficultly soluble highly polar, synthetic polymer in the solvent system of claim 1.

7. A solution of difficultly soluble highly polar, synthetic polymer in the solvent system of claim 2.

8. A solution of difficultly soluble highly polar, synthetic polymer in the solvent system of claim 3.

9. A solution of difficultly soluble highly polar, synthetic polymer in the solvent system of claim 4.

10. A solution of a polyacrylonitrile polymer or copolymer in the solvent system of claim 1.

11. A solution of a polyacrylonitrile polymer or copolymer in the solvent system of claim 2.

12. A solution of a polyacrylonitrile polymer or copolymer in the solvent system of claim 3.

13. A solution of a polyacrylonitrile polymer or copolymer in the solvent system of claim 4.

14. A method of casting film comprising providing a solution according to any of claims 10 to 13, casting the same on a heated solid surface and evaporating solvent from the resulting film.

15. The method of claim 14 followed by the step of biaxially stretching the cast film.

16. The film resulting from the method of claim 15.

* * * * *